(12) United States Patent
Bello et al.

(10) Patent No.: US 11,835,469 B2
(45) Date of Patent: Dec. 5, 2023

(54) APPARATUS AND METHODS FOR THE AUTOMATIC CLEANING AND INSPECTION SYSTEMS OF COKE DRUMS

(71) Applicants: Roberto Enrique Bello, Los Teques - Los Teques (VE); Gabriel Vivas, Los Teques - Estado Miranda (VE)

(72) Inventors: Roberto Enrique Bello, Los Teques - Los Teques (VE); Gabriel Vivas, Los Teques - Estado Miranda (VE)

( * ) Notice: Subject to any disclaimer, the term of this patent is extended or adjusted under 35 U.S.C. 154(b) by 342 days.

(21) Appl. No.: 17/447,834

(22) Filed: Sep. 16, 2021

(65) Prior Publication Data

US 2022/0082509 A1 Mar. 17, 2022

Related U.S. Application Data

(60) Provisional application No. 63/079,139, filed on Sep. 16, 2020.

(51) Int. Cl.
| | | |
|---|---|---|
| *G01N 21/90* | (2006.01) | |
| *G01N 29/22* | (2006.01) | |
| *G01N 21/01* | (2006.01) | |

(52) U.S. Cl.
CPC ....... *G01N 21/9009* (2013.01); *G01N 29/223* (2013.01); *G01N 2021/0187* (2013.01); *G01N 2201/0224* (2013.01); *G01N 2201/0225* (2013.01); *G01N 2201/06* (2013.01); *G01N 2201/102* (2013.01); *G01N 2291/2636* (2013.01)

(58) Field of Classification Search
CPC ............. G01N 21/9009; G01N 29/223; G01N 2021/0187; G01N 2201/0224; G01N 2201/0225; G01N 2201/06; G01N 2201/102; G01N 2291/2636; G01N 2021/9542; G01N 21/954; G01N 29/043
USPC .......................................................... 356/426
See application file for complete search history.

(56) References Cited

U.S. PATENT DOCUMENTS

| | | |
|---|---|---|
| 3,809,607 A | 5/1974 | Murray et al. |
| 4,169,758 A | 10/1979 | Blackstone et al. |
| 4,393,711 A | 7/1983 | Lapides |
| 4,742,713 A | 5/1988 | Abe et al. |
| 5,425,279 A | 6/1995 | Clark et al. |
| 5,680,215 A | 10/1997 | Huber et al. |
| 5,804,730 A | 9/1998 | Pfannenstiel et al. |
| 6,104,970 A | 8/2000 | Schmidt, Jr. et al. |
| 7,784,347 B2 | 8/2010 | Messer et al. |
| 7,940,298 B2 | 5/2011 | Clark et al. |

(Continued)

FOREIGN PATENT DOCUMENTS

| | | |
|---|---|---|
| CN | 103558293 A | 2/2014 |
| JP | 2003013070 A | 1/2003 |
| JP | 2011237234 A | 11/2011 |

*Primary Examiner* — Md M Rahman
(74) *Attorney, Agent, or Firm* — Matthew J Patterson

(57) ABSTRACT

An integral system for automated and non-intrusive of cleaning and non-destructive inspection (ultrasonic volumetric testing and visual testing) to detect, characterize and monitor with precision the level of internal and external damage (Cracks, deformations, corrosion, erosion, etc.) that may be present in coke drums throughout their life cycle is disclosed. Embodiments are disclosed that enable a condition of a coke drum to be estimated in a reliable manner for their fitness for service from the results obtained from the automated inspection with the non-destructive methods of ultrasound and visual testing.

25 Claims, 9 Drawing Sheets

(56) References Cited

U.S. PATENT DOCUMENTS

| | | |
|---|---|---|
| 8,436,898 B1 | 5/2013 | Clark et al. |
| 9,524,542 B1 | 12/2016 | Clark et al. |
| 2005/0151841 A1 | 7/2005 | Nelson et al. |
| 2006/0288756 A1 | 12/2006 | De Meurechy |
| 2007/0000328 A1 | 1/2007 | Buttram |
| 2010/0007729 A1 | 1/2010 | Clark et al. |
| 2011/0272617 A1 | 11/2011 | Lah |
| 2013/0329848 A1 | 12/2013 | Linnebur |

APPARATUS AND METHODS FOR THE AUTOMATIC CLEANING AND INSPECTION SYSTEMS OF COKE DRUMS

CROSS REFERENCE TO RELATED APPLICATIONS

This application claims the benefit of U.S. Provisional Patent Application Ser. No. 63/079,139 filed 16 Sep. 2020. The disclosure of the application above are incorporated herein by reference in their entirety.

FIELD OF THE DISCLOSURE

Embodiments of the present disclosure relate to an automated and non-intrusive integral system and method of cleaning and inspection by non-destructive testing; visual testing (VT) and ultrasonic testing (UT) capable of detecting and characterizing internal and external cracks regardless of the nominal thickness of the cylindrical, cone-skirt and conical sections in delayed coke drums.

In certain embodiments, the results obtained by the ultrasonic inspection, it will be possible to estimate the condition of the coke drums by their fitness for service and in this manner to increase the operational reliability of these pressure vessels.

DESCRIPTION OF THE RELATED ART

Around the world, the oil industry uses coke drums as a technology for the upgrade of heavy oil and coke production. This process is affected by the decrease in the life of coke drums caused by the phenomenon of low cycle fatigue, generating cracks and deformations that must be inspected and repaired, affecting the continuous operation of the delayed coking units.

Most coke drums are constructed with a low alloy steel specification ASTM A-387 Gr 11 (1¼ Cr-½ Mo), as well as ASTM A-387 Gr 12 (1 Cr-½ Mo) or ASTM A-387 Gr 22 (2¼ Cr-1 Mo). The thicknesses can vary depending on the elevation and location of the plates of these pressure vessels, which become thinner from the bottom to the top; they are usually from 1 in to 2 in of Thickness (25.4 mm to 50.8 mm). They can have a cladding of ASTM A-240 type 410 with a thickness of 3.2 mm (⅛ in), which gives them a high resistance to corrosion and abrasion. The horizontal or circumferential welds that attach to each of the plates can have an inner and outer crown approximately 50 cm (19.68 in) of wide and are flat flush with the surface.

Currently, operators (Refineries and Upgraders) of coke drums worldwide are decreasing the time of operating cycles in a half, which will result in the appearance of cracks, bulges or other defects in a shorter time in these pressure vessels. As a result, it is necessary that the interior and exterior of such pressure vessels be frequently cleaned and inspected using non-destructive testing techniques. In the past and at present, such volumetric inspections (i.e. detect defects in the entire volume of the material as opposed to just surface defects) have been achieved in the following ways:

1. Emptying the vessel, installing internal scaffolds and manually and physically inspecting the interior surfaces of the vessel, detecting deformations, cracks and other defects;
2. Installing external scaffolds, disassembling the thermal insulation and inspect manually from the outer surface of the vessel to detect deformations, cracks and other defects; and
3. Rappelling by manually inspecting from the outer or interior surface of the container to detect deformations, cracks and other defects.

All of the above are performed in an intrusive manner.

At present, there are no automated technologies to estimate the condition of coke drums and to evaluate their fitness for service in a reliable manner through the results of a non-intrusive volumetric inspection, regardless of the origin of the crack (internal, external or embedded in the cladding) and the thickness of the vessel wall.

For each of these non-destructive inspections (volumetric as and no volumetric) in a coke drum, or in any pressure vessel, the inspections must be carried out after an adequate cleaning of the welds or areas of interest in order to obtain a surface finish that allows obtaining reliable results.

At present, if it is required to perform an internal cleaning of a coke drum in a non-intrusive manner, this is only done through the use of a cutting tool and it does not tend to be effective. In addition, there is no automated inspection system and method in the world able to detect and characterize the cracks in the AID and AOD areas as defined by American Petroleum Institute API 1996 (Coke Drum Survey) and where the "A" corresponds identifies a crack in the weld of the shell or body of the container and the acronym ID and OD indicate whether the crack is located in the inner or outer diameter of the cone-skirt joint of a coke drum.

The systems, methods and technologies of non-intrusive and intrusive inspection in coke drums of the prior art have at least the following limitations:
I. Highly expensive;
II. When the inspection is internal it requires the use of scaffolding
III. When the inspection is external it requires the use of scaffolding and the removal of thermal insulation
IV. They do not perform efficient cleaning to obtain optimal surface finishes that guarantee reliable results;
V. Manual methods require long times to clean and inspect;
VI. In manual methods, personnel are exposed to possible accidents (falls, gases, etc.);
VII. Automated methods do not detect external cracks;
VIII. The automated methods detect internal cracks if and only if they are connected to the internal surface of the pressure vessel;
IX. In automated methods, if the cracks are in the interface or fusion zone between the base metal and the overlay, they do not detect them;
X. Automated methods have limitations to measure depth of cracks;
XI. Automated methods cannot detect cracks in an AID zone located in the cone-skirt joint of the coke drums; and
XII. Automated methods do not allow their use as reliable input for the fitness for service of cracked internal and external areas in the sections: cylindrical, cone-skirt junction and conical for coke drums.

What is needed is improved intrusive and non-intrusive inspection methodologies and systems for the internal and external cleaning and volumetric inspection of coke drums

SUMMARY OF THE INVENTION

An integral system and method of cleaning and non-intrusive volumetric inspection of delayed coke drums is described to inspect the internal and external surfaces in order to detect, characterize and monitor cracks and other defects from non-destructive methods as visual VT and ultrasound UT using a non-destructive testing device.

The integral system and method of the present disclosure is unique, since it is possible to obtain the suitable internal surface finish of the coke drum by means of a water blasting, sandblasting, shot peening or laser cleaning. Additionally, embodiments of the present invention are characterized as being unique in that they use a crawler or tracking device with combinations of non-destructive inspection methods UT (volumetric) and VT inside a delayed coke drum which is entered and positioned inside this pressure vessel in an independent and autonomous manner guided by remote control operation from the outside of the coke drum. This UT (volumetric) and VT crawler is capable of detecting and characterizing internal cracks (regardless of the depth of the crack and the wall thickness of the pressure vessel) as well as external cracks. These features make embodiments of the present disclosure unique in automated non-intrusive inspection systems of coke drums. In addition, embodiments of the present disclosure are unique in that they are configured to detect and characterize cracks in the areas of the cone-skirt junction identifies as the AID and the AOD by the American Petroleum Institute 1996 API Coke drum survey (2003).

From the results obtained with the system and method of the present disclosure (with the use of ultrasonic inspection), the condition of the coke drums can be estimated by their evaluation of fitness for service and in this way increasing the operational reliability of these pressure vessels; This characteristic is unique in automated and non-intrusive inspection systems for coke drums.

The present invention can be used in delayed coke drums containing or not containing sliding valves.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes an adjustable ramp system configured to transfer an inspection crawler into and out of an interior space of the coke drum the adjustable ramp may include a horizontal section having a horizontal length which may include a drive gear rotatably positioned on a first end, a first guided gear in meshing arrangement with the drive gear coupled to a first worm screw rotatably mounted to the horizontal section, a second guided gear in meshing arrangement with the drive gear coupled to a second worm screw rotatably mounted to the horizontal section a vertical section having an adjustable vertical length, a first vertical drive shaft threadably engaged within a portion of the horizontal section and in meshing arrangement with the first worm screw, a second vertical drive shaft threadably engaged within a portion of the horizontal section and in meshing arrangement with the second worm screw an angular displacement device positioned on a bottom end of the vertical section configured to be angularly adjustable relative to the vertical section and a front section having an adjustable front section length coupled to the angular displacement device and a ramp surface having an adjustable ramp length positioned on a portion of the horizontal section, the vertical section and the front section configured to provide a contiguous surface. Other embodiments of this aspect include corresponding computer systems, apparatus, and computer programs recorded on one or more computer storage devices, each configured to perform the actions of the methods.

Implementations may include one or more of the following features. The coke drum inspection system where the horizontal section is configured to couple to an inlet of the coke drum. The adjustable vertical length is configured to be adjusted by rotation of the drive gear to accommodate a length of the inlet of the coke drum. The inlet of the coke drum may include any of a flange and a sliding valve. The angular displacement device is configured to angularly adjust the front section to a predetermined angle relative the vertical section and the front section is configured to adjust the front section length to contact an inside surface of the interior space of the coke drum at a predetermined location. The inspection crawler may include a chassis and a drive system mounted to the chassis, a reception device configured to allow a remote control operation of the inspection crawler, and at least one non-destructive testing device mounted to the inspection crawler. At least a portion of the drive system may include a magnetic material, the ramp surface is may include a ferrous material and the coke drum may include a ferrous material and where the drive system is configured to propel the inspection crawler along the ramp surface and along the inside surface of the interior space of the coke drum. The at least one inspection device may include an ultrasonic testing system. The ultrasonic testing system may include an articulating frame mounted to the chassis, and a plurality of ultrasonic testing probes mounted to the frame and configured to contact a portion of the inside surface of the interior space of the coke drum. The at least one inspection device may include a visual testing system. The visual testing system may include a camera and a lighting system. The coke drum inspection system may include a lighting system positioned on the front section. Implementations of the described techniques may include hardware, a method or process, or computer software on a computer-accessible medium.

One general aspect includes a method of inspecting a coke drum. The method of inspecting also includes providing an adjustable ramp system having a horizontal a vertical section having an adjustable vertical length, an angular displacement device positioned on a bottom end of the vertical section and a front section having an adjustable front section length coupled to the angular displacement device and a ramp surface having an adjustable ramp length positioned on a portion of the horizontal section, the vertical section and the front section configured to provide a contiguous surface. Other embodiments of this aspect include corresponding computer systems, apparatus, and computer programs recorded on one or more computer storage devices, each configured to perform the actions of the methods.

Implementations may include one or more of the following features. The method of inspecting a coke drum may include coupling the horizontal section to an inlet of the coke drum. The method of inspecting a coke drum may include adjusting the vertical length to accommodate a length of the inlet of the coke drum. The method of inspecting a coke drum may include adjusting the angular displacement device, and adjusting the front section length and contacting an inside surface of an interior space of the coke drum at a first predetermined location. The method of inspecting a coke drum may include providing an inspection crawler having a chassis and a drive system mounted to the chassis and at least one non-destructive testing device mounted to the inspection crawler, placing the inspection crawler on the adjustable ramp, and remotely controlling the inspection crawler from outside of the interior space of the coke drum.

The method of inspecting a coke drum may include propelling the inspection crawler along the ramp surface and along the inside surface of the interior space of the coke drum. The method of inspecting a coke drum may include inspecting the coke drum using the at least one non-destructive testing device. The method of inspecting a coke drum may include controlling the inspection crawler to the adjustable ramp and removing the inspection crawler from the coke drum. The method of inspecting a coke drum may include adjusting the angular displacement device, adjusting the front section length and contacting an inside surface of the interior space of the coke drum at a second predetermined location, placing the inspection crawler on the adjustable ramp, remotely controlling the inspection crawler from outside of the interior space of the coke drum, propelling the inspection crawler along the ramp surface and along the inside surface of the interior space of the coke drum, and inspecting the coke drum using the at least one non-destructive testing device. The at least one inspection device may include an ultrasonic testing system, the method may include ultrasonically inspecting the coke drum. The ultrasonic testing system further may include a plurality of ultrasonic testing probes, and positioning the plurality of ultrasonic testing probes to contact the inside surface of the interior space of the coke drum. The at least one inspection device may include a visual testing system, the method may include visually inspecting the interior space of the coke drum. The method of inspecting a coke drum may include providing a lighting system positioned on the front section and lighting the interior space of the coke drum. Implementations of the described techniques may include hardware, a method or process, or computer software on a computer-accessible medium.

BRIEF DESCRIPTION OF THE DRAWINGS

So that the manner in which the above-recited features of the present disclosure can be understood in detail, a more particular description of the disclosure, briefly summarized above, can be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein can be practiced. It is to be understood that other embodiments can be utilized, and structural changes can be made without departing from the scope of the disclosure.

Figure 1A:
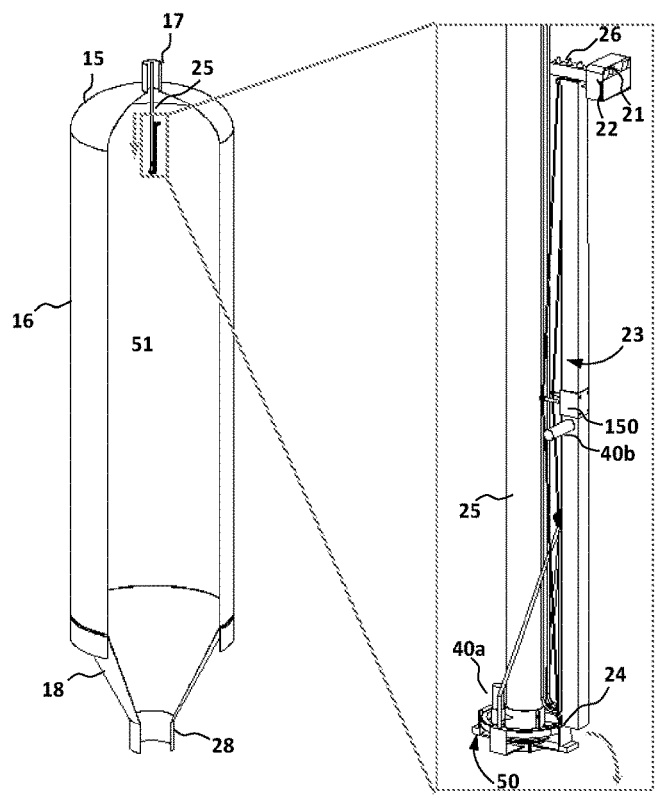
FIG. 1A is a detailed section view of a support structure of a cleaning mechanism inside a delayed coke drum in accordance with the present disclosure.
Figure 1B:
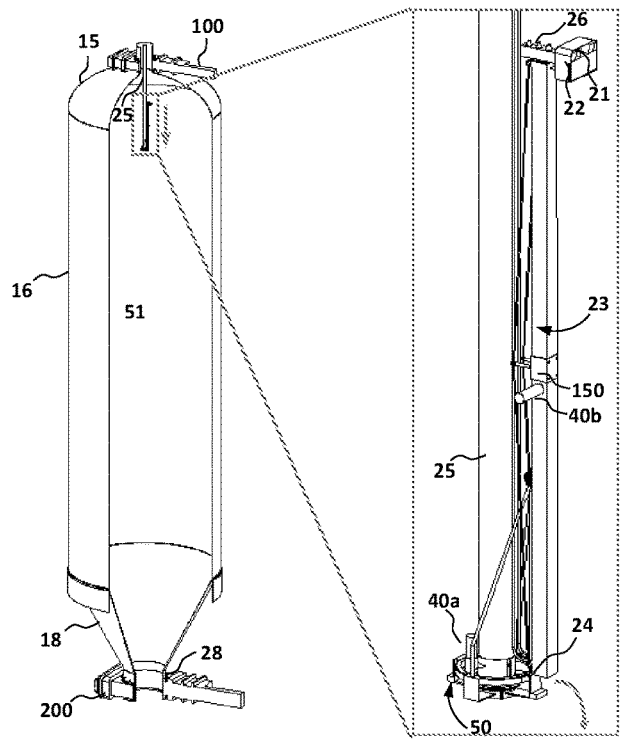
FIG. 1B is a detailed section view of a support structure of a cleaning mechanism inside a delayed coke drum in accordance with the present disclosure.
Figure 2:
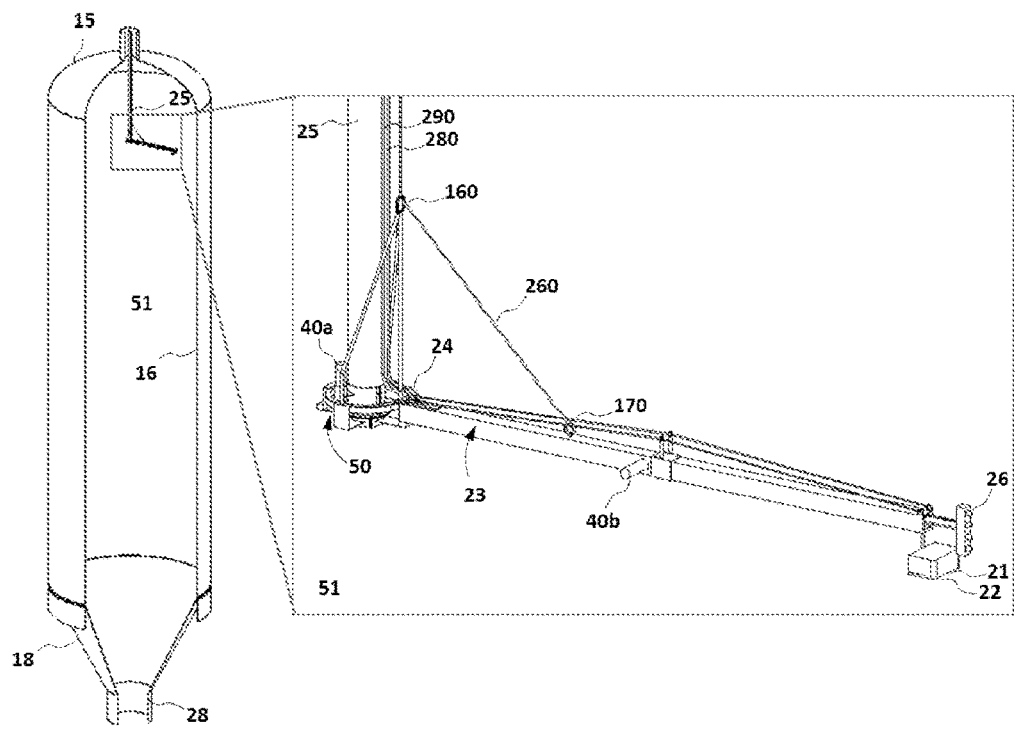
FIG. 2 is a detailed section view of a support structure of a cleaning mechanism articulated at 90° with respect to the cutting tool inside a delayed coke drum in accordance with the present disclosure.
Figure 3:
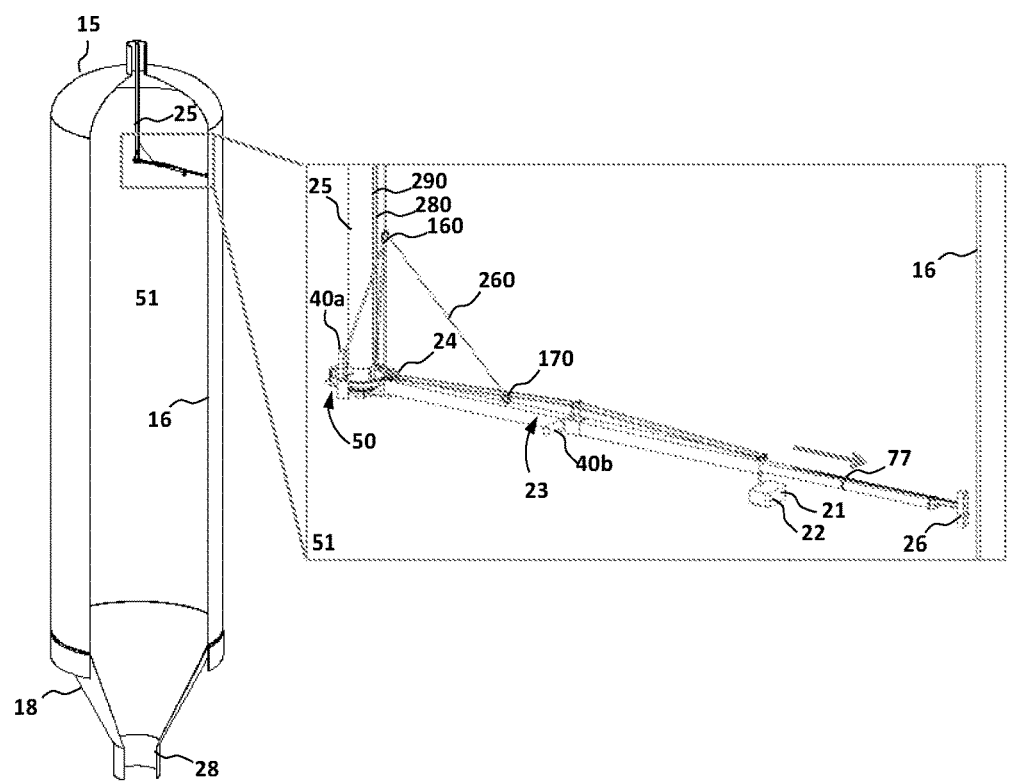
FIG. 3 shows inside a delayed coke drum the support structure of the cleaning mechanism articulated at 90° with respect to the cutting tool and extended towards the internal wall of the pressure vessel in accordance with the present disclosure.

With reference to FIGS. 1A and 1B, the method of embodiments of the present disclosure is carried out in such a way that cleaning and inspection system 23 is supported on cutting tool 25 and it is introduced through upper flange 17 of delayed coke drum 15, The inspection system 23 is comprised of a reducer gear box 50 attached to cutting tool 25 using a clamp, this gear box 50 is activated by electric motor 40a that induces rotational movement to the inspection system around the cutting tool. Referring next to FIGS. 2 and 3, reducer gear box 50 is connected to a support structure by an articulated joint 24 containing a cleaning mechanism 26 including a pipe system 280, in order to perform the cleaning of the internal surface 16 of the welds of the pressure vessel or any area of coke drum 15 that it is desired to clean for an inspection (FIG. 3). It should be appreciated by those skilled in the art that non-destructive inspection requires a good cleaning of the coupling surface to obtain satisfactory results. Support structure 23 is articulated manually by a metal cord 260 which is attached to the support structure 23 through a ring 170 attached to the support structure and a ring 160 connecting the metal cord to reducer gear box 50.

Figure 4:
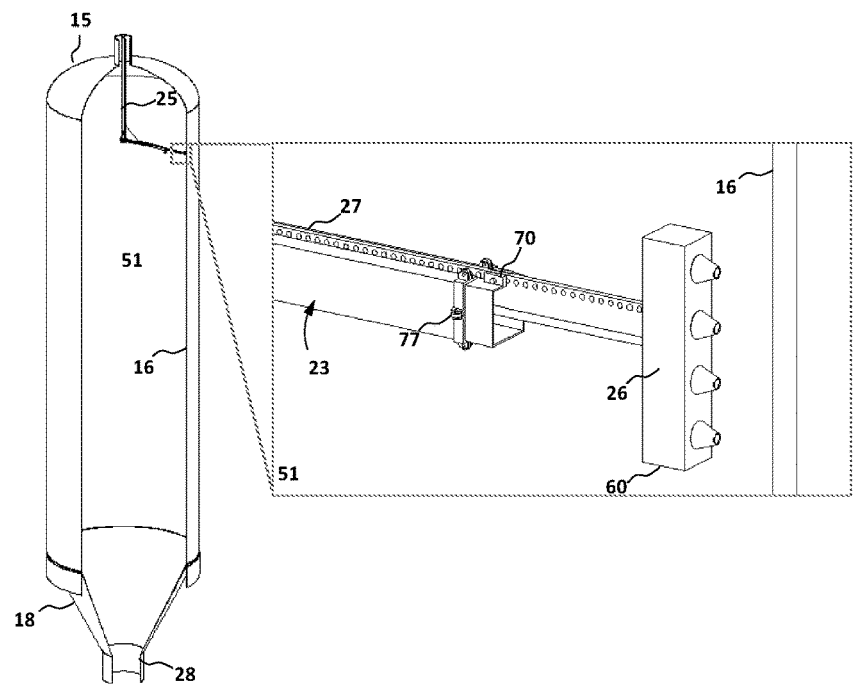
FIG. 4 shows details of end of the cleaning device near to the internal wall of the pressure vessel in accordance with the present disclosure.
Figure 5A:
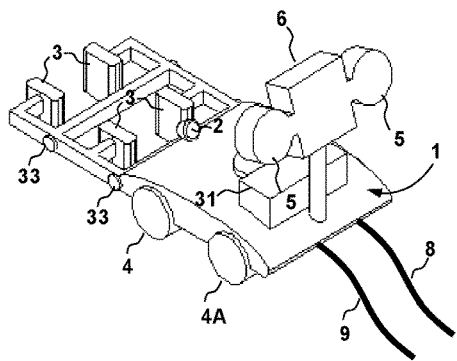
FIG. 5A is an isometric view of a UT and VT inspection crawler for coke drums in accordance with the present disclosure.
Figure 5B:
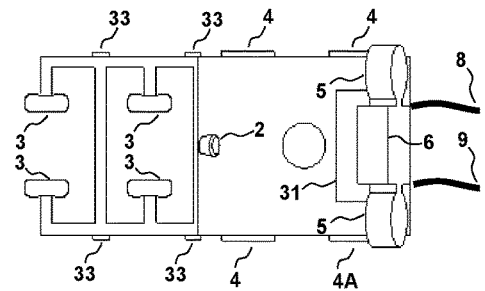
FIG. 5B is a top view of a UT and VT inspection crawler for coke drums in accordance with the present disclosure.
Figure 5C:
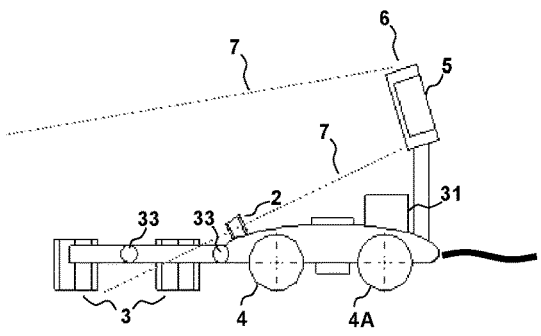
FIG. 5C is a left side view of a UT and VT inspection crawler for coke drums in accordance with the present disclosure.
Figure 5D:
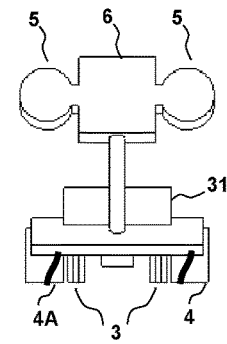
FIG. 5D is rear view of a UT and VT inspection crawler for coke drums in accordance with the present disclosure.

Still referring to FIG. 3, video device 21 comprised of a video camera is supported in the bottom section of the cleaning system 23 and is protected within a gas capsule provided by a system pipe 290, this video camera captures videos and images of circumferential, longitudinal welds and any part of the inner surface 16 of the pressure vessel during cleaning time. Video device 21 is capable of moving its visual field and focus at different angles and can be assisted by a lighting mechanism that provides a better definition of the images. Visual data is collected by video device 21 and the data collected is stored in a computer that is located on the outside of the pressure vessel 15. Inside the gas capsule and positioned next to the video camera is also an approximation laser sensor, capable of measuring the distance with the area focused by the video device 21. Referring to FIG. 4, there is shown cleaning device 26 located at the end of the structure of the cleaning mechanism 23 wherein the cleaning device is configured to work with water and/or solid particles under pressure and this manner ensure the necessary cleaning for inspection. The cleaning device 26 is comprised of pipe system 280 (FIG. 3) containing a length adapter 27 including a plurality of holes and a holder introduced inside the selected hole of the length adapter. Additionally, a retractable mechanism is also activated through motor 40b (FIG. 3) which is capable to bring the plurality of cleaning nozzles of cleaning device 26 closer to the internal surface of the coke drum 16 through a sliding system 77 by means of an approach sensor 60 in order to reach the optimum distance for the cleaning operation. Once the internal surface 16 has been visually inspected and cleaned, reaching the appropriate surface finish, the UT inspection as will be disclosed in more detail herein below:

With respect to FIG. 1B, in embodiments of delayed coke drums 15 having sliding valves in upper section 100, it should be appreciated by those skilled in the art that it can be necessary to perform extra maneuvers to manipulate for cutting tool 25 carefully as well as the entry and exit from pressure vessel 15 in order to avoid damaging any of the internal components of the sliding valves.

Figure 6A:
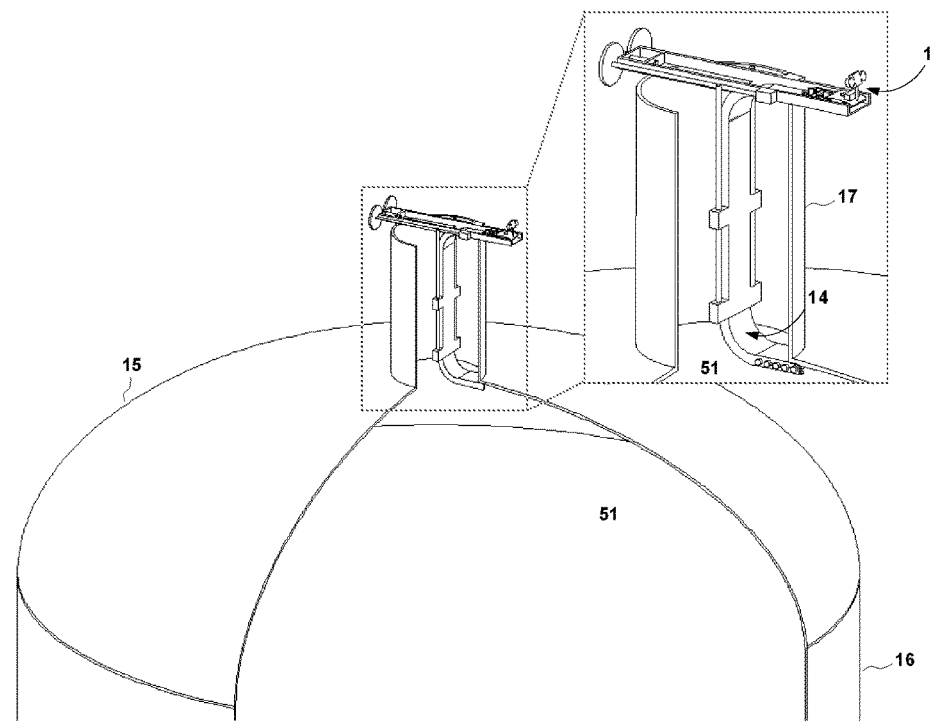
FIG. 6A is a detailed view of a coupling of an adjustable ramp to the upper flange of the delayed coke drum for positioning an UT and VT inspection crawler on its internal surface in accordance with the present disclosure.
Figure 6B:
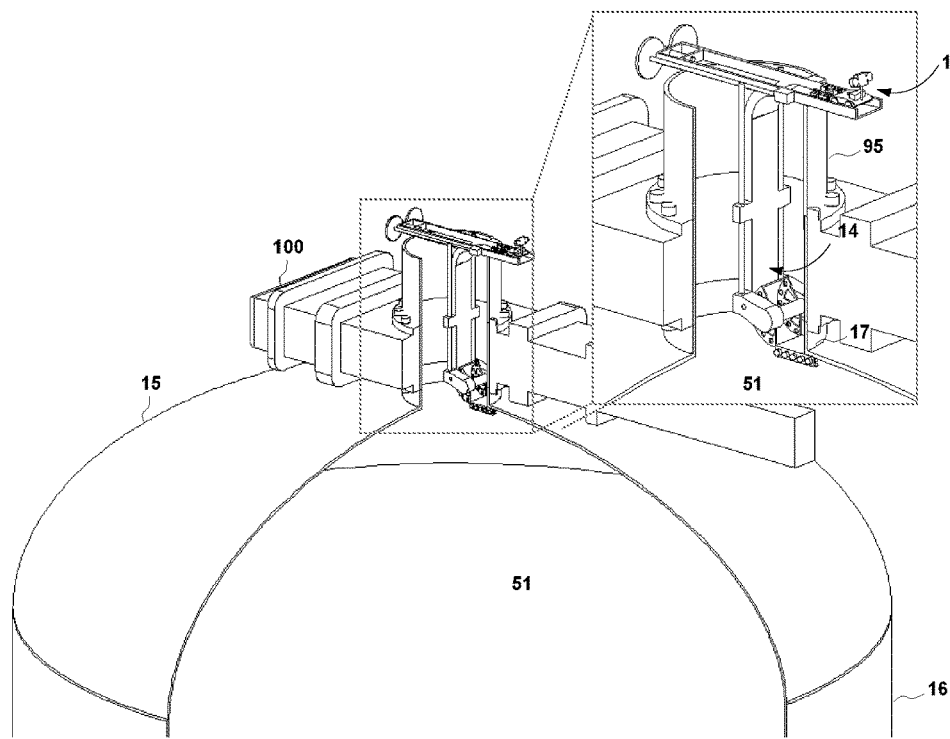
FIG. 6B is a detailed view of a coupling of an adjustable ramp to the upper flange of the delayed coke drum for positioning an UT and VT inspection crawler on its internal surface in accordance with the present disclosure.
Figure 6C:
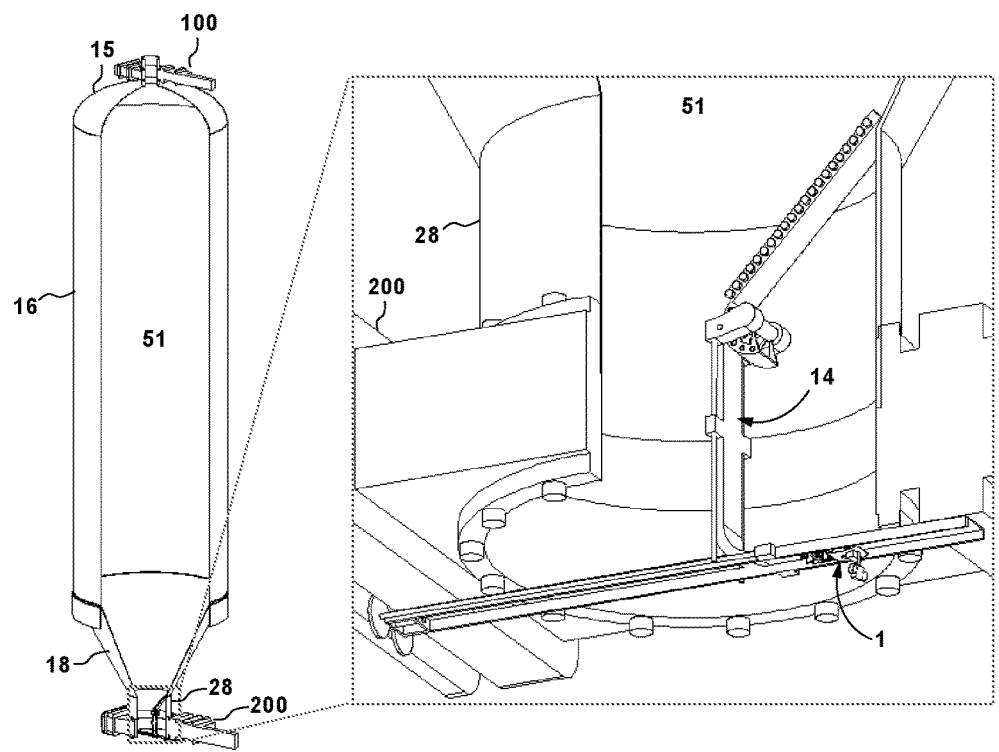
FIG. 6C is a detailed view of a coupling of an adjustable ramp to the upper flange of the delayed coke drum for positioning an UT and VT inspection crawler on its internal surface in accordance with the present disclosure.
Figure 6D:
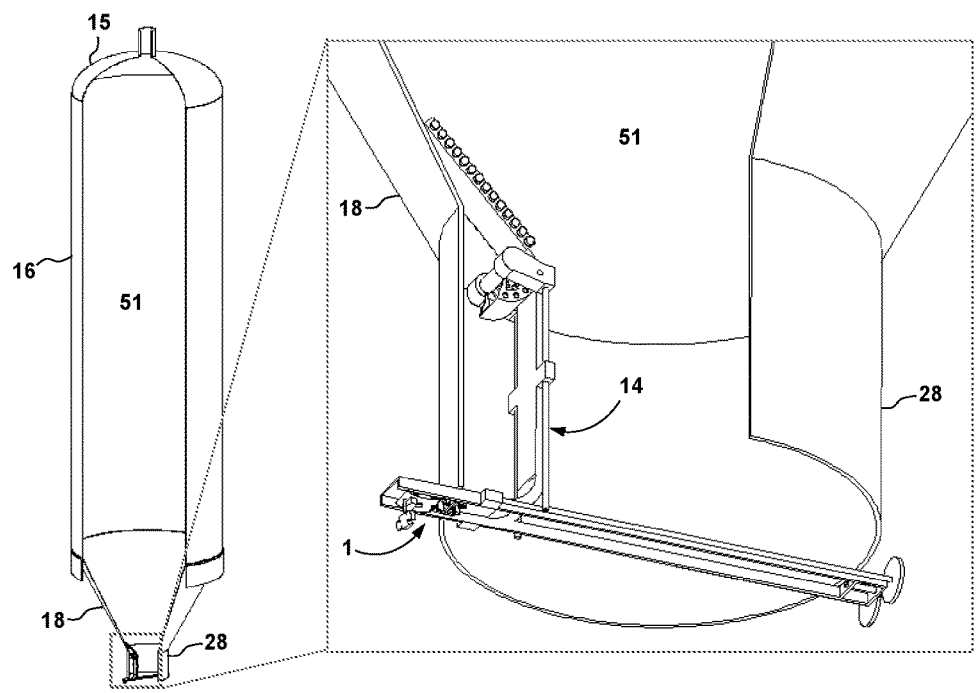
FIG. 6D is a detailed view of a coupling of an adjustable ramp to the upper flange of the delayed coke drum for positioning an UT and VT inspection crawler on its internal surface in accordance with the present disclosure.
Figure 7A:
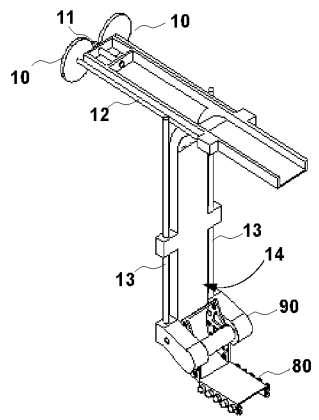
FIG. 7A is an isometric view of an adjustable ramp for the entry, positioning and extraction of the UT and VT inspection crawler from the interior of the coke drum in accordance with the present disclosure.
Figure 7B:
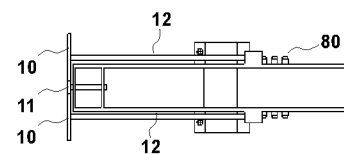
FIG. 7B is top view of an adjustable ramp for the entry, positioning and extraction of the UT and VT inspection crawler from the interior of the coke drum in accordance with the present disclosure.
Figure 7C:
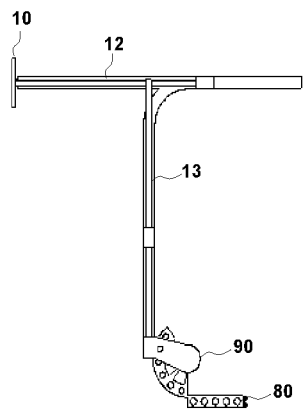
FIG. 7C is left side view of an adjustable ramp for the entry, positioning and extraction of the UT and VT inspection crawler from the interior of the coke drum in accordance with the present disclosure.
Figure 7D:
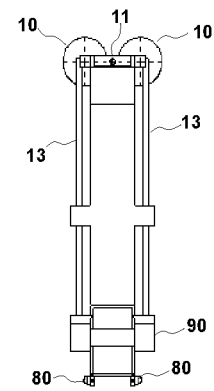
FIG. 7D is front view of an adjustable ramp for the entry, positioning and extraction of the UT and VT inspection crawler from the interior of the coke drum in accordance with the present disclosure.

Generally referring to FIGS. 6A-6D, after having carried out the remote visual inspection and the cleaning of the areas of interest for the UT inspection as disclosed herein above, the cleaning and inspection system 23 (FIGS. 1A, 1B) can be extracted from the interior 51 of the coke drum 15 and wherein an adjustable ramp system comprises an adjustable access ramp 14 having an adjustable ramp length can be fitted which can be used for accessing the upper flange 17 (FIGS. 6A, 6B) as well as the lower flange 28 (FIGS. 6A, 6C) of the delayed coke drum 15 wherein the front section of the ramp can be contacted at a predetermined location of the coke drum. If the coke drum 15 to be inspected has slide valves (FIGS. 6B, 6C), in the case of the stop valve 100 the adjustable ramp 14 will be supported in the Stem Guide Enclosure Cover Sheet 95 (FIG. 6B). It should be appreciated by those skilled in the art that adjustable access ramp 14 is configured to transfer inspection crawler 14 into and out of the interior of coke drum 15. The ramp surface of adjustable access ramp 14 is configured such that as the adjustable ramp length is changed that there exists a contiguous surface from one end of the ramp to the other. In embodiments including a lower slide valve 200, adjustable ramp 14 will be supported in the lower section of the valve. With specific reference to FIGS. 8 and 9, adjustable ramp 14 is shown positioned in the lower section of lower slide valve 200 in order to allow the entry, positioning and extraction of the UT and VT inspection crawler 1 (FIGS. 5A-5D) in the inner surface of the pressure vessel 16. UT and VT inspection crawler 1 includes an ultrasonic testing system and a visual testing system and is operated from the outside of the coke drum 15 by remote control and the operator performs the crawler movement by means of the video camera 6 (FIGS. 5A-5D) positioned at the rear part of UT and VT inspection crawler 1.

The electrical parts of the devices used (cameras, UT equipment, etc.) in the cleaning and inspection system and the inspection crawler 1 are encapsulated and protected by a gas pressure higher than the internal pressure of the coke drum 15.

Figure 10A:
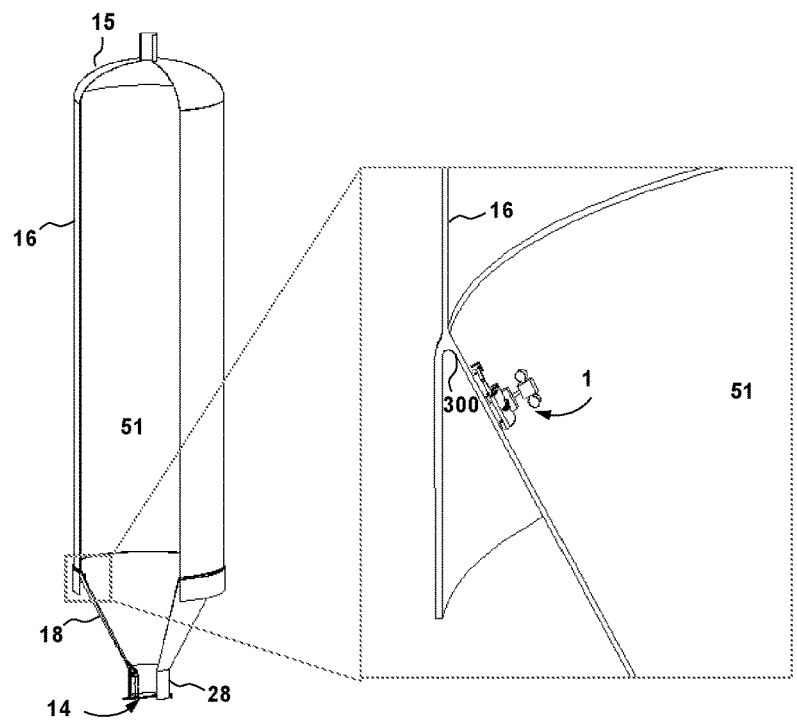
FIG. 10A is a detailed view of a cone-skirt junction of a coke drum showing the positioning of the crawler for the detection and characterization of cracks in the susceptible zones of these cracks (AID and AOD areas) in accordance with the present disclosure.
Figure 10B:
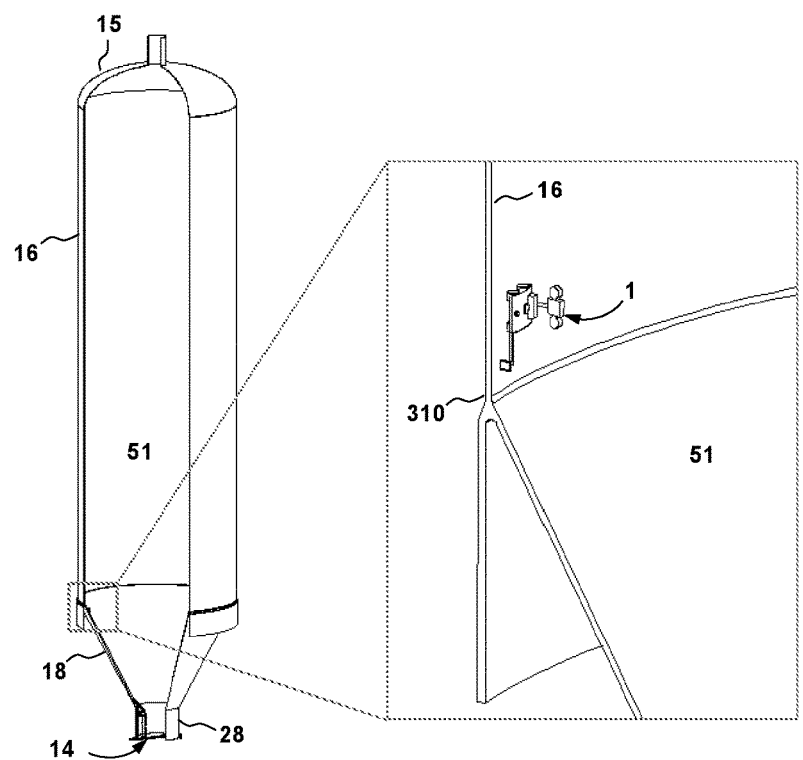
FIG. 10B is a detailed view of a cone-skirt junction of a coke drum showing the positioning of the crawler for the detection and characterization of cracks in the susceptible zones of these cracks (AID and AOD areas) in accordance with the present disclosure.

The UT and VT signals obtained from the UT reception and emission device of the cylindrical sections 16 of coke drum 15, conical section 18 (FIG. 8) and cone-skirt junction of cone 300 (FIG. 10A) and skirt 310 (FIG. 10B) are transmitted to a computer located on the outside of the coke drum 15 through a wiring system 8 (FIG. 5A-5D) specific for this purpose, at the same time, the UT probes 3 located in the front of inspection crawler 1 have an input for the irrigation of the coupling between the UT probes and the coke drum 15 and this is supplied by a system of hoses 9 coming from the outside of the coke drum.

Once the UT inspection is completed, UT and VT inspection crawler 1 is removed from the inside 51 of the coke drum 15 by use of the adjustable ramp 14 (FIG. 9) located in the upper nozzle 17 or lower nozzle 28 of the drum and finally it removes the access ramp 14, leaving the pressure vessel 15 available for operation.

FIGS. 1A and 1B, the support structure of the cleaning mechanism inside a delayed coke drum is shown which can even work with or without sliding valves.

Referring to FIGS. 1A and 1B, the reducer gear box 50 is coupled to the cutting tool 25 of the coke drum 15 and activated in its rotational movement by a motor 40a and is remotely maneuvered from the outside of the pressure vessel. FIGS. 1A and 1B differ in that the entry maneuvers of the cleaning and inspection system 23 can be executed in delayed coke drums 15 with or without sliding valves.

As shown in FIGS. 1A, 1B, a typical delayed coke drum 15, has two closing flanges that guarantee the tightness of the pressure vessel and that also serve for entry of personnel to perform cleaning and intrusive inspections, as well as the entrance of the cutting tool 25. The upper flange 17 and the lower flange 28 are of diameters greater than 24 inches and in both of them sliding valves 100 and 200 can be respectively connected. The wall thickness of the drum 15 is greater than 1 inch and may vary with its elevation. In addition, the external surface of the pressure vessel 16 is covered or thermally insulated (not shown).

Referring to FIGS. 1A, 1B, cutting tool 25 is generally comprised of a cylindrical pipe and a drill (not shown), which are introduced from the upper part of the drum 15, by the upper flange 17 moving vertically downwardly through the internal part of the pressure vessel 51 to the lower flange 28 where the product "Coke" is downloaded. Cutting tool 25 has the function of cutting the coke inside 51 of coke drum 15. In embodiments of the present disclosure, cutting tool 25 is equipped with cleaning and inspection system 23 and is configured to introduce the cleaning and inspection system inside the pressure vessel 51 and to move it vertically therein. The movement of cutting tool 25 is controlled by an independent motor of the cleaning and inspection system 23 and at the time of cleaning and inspection, the cutting tool is held stable and adjusted in embodiments having a superior sliding valve. In other embodiments Stem Guide Enclosure Cover Sheet 95 (FIG. 6B) provides the stability and adjustment of the cutting tool. Turning motor 40a is configured to control the radial movement of inspection system 23, wherein the turning motor independently controls the circumferential movement of the inspection system with respect to the cutting tool 25.

Referring again to FIGS. 2, 3, support structure 23 contains a remote visual inspection device (RVI) that is comprised of a video and photography camera 21 with built-in lighting, which are inside a capsule that manages a gas or air current provided by a hose 290 that serves as protection for the electronic components. An approximation laser device 22 is positioned in the central axis of the remote visual inspection system RVI wherein the approximation laser device capable of measuring the distance between the front of the camera 21 and the internal wall of pressure vessel 16.

The video and photo camera 21 contained in the capsule is capable of being moved in both the radial direction (circumferentially) and vertical direction (up and down), which enables the camera to be tilted before focusing on any particular area within pressure vessel 16. Video and photography camera 21 is preferable of high resolution capable of being used by those skilled in the art.

The video and photography camera 21 contained in the capsule beyond having a first lighting control, is assisted by a second complementary lighting system in which each source can act independently and the intensity of each of the sources can be adjusted.

As disclosed herein above, cleaning system 23 enters interior 51 of coke drum 15 downwardly in the vertical direction coupled to the cutting tool 25 through the upper nozzle 17, or through the Stem Guide Enclosure Cover Sheet 95 (FIG. 6B). Once cleaning system 23 is positioned inside the coke drum 15, it is actuated by articulation 24 located at an end of the gear box 50 allowing the support structure of the cleaning and inspection system 23 (FIG. 3) to be positioned 90 degrees to cutting tool 25. The cleaning portion of cleaning and inspection structure 23 is comprised of hose 280 and a manifold of nozzles 26 (FIG. 4) which has the ability to move horizontally with a retractable mechanism with the use of a motor 40b (see FIG. 3). The rotational movement in circumferential direction of cleaning and inspection system 23 is controlled by remote control independently of the cutting tool 25 by using the motor 40a, in order to perform the cleaning of the areas to be inspected with UT and VT inspection crawler 1.

Referring now to FIGS. 5A-5D, there is shown the detail of UT and VT inspection crawler 1. The UT and VT inspection crawler 1 includes a laser that has the objective of guiding it through the welded joint to be inspected considering an equidistant position between UT probes 3. Once UT and VT inspection crawler 1 is positioned on the inner surface 16 of the coke drum 15, UT probes 3 are remotely adjusted within an articulating frame mounted to the chassis of the inspection crawler by means of the articulate junction 33 to the distances established by predetermined scan plans prepared for the inspection procedures by UT. It should be appreciated by those skilled in the art that such pans can be comprised of Phased array and Time-of-flight diffraction (TOFD) time testing and other known ultrasonic techniques. UT probes 3 have an irrigation system that supplies a fluid to couple probes to the wall of coke drum 15 to guarantee the transmission, emission and reception of UT signals. The irrigation system of UT probes 3 is fed by hose 9 that is coupled to a fluid supply positioned on the outside of the coke drum 15. The inspection crawler of UT and VT 1 is operated by remote control and its movement on the internal surface 16 of the coke drum 15 can be accomplished using a drive system such as with the use of magnetic wheels 4a, 4 as well as a caterpillar system (not shown) made of a magnetic material. In the case of using magnetic wheels, inspection crawler of UT and VT 1 includes four magnetic wheels 4 of which one also functions as encoder 4A for the registration of its displacement. The interior of coke drum 15 and the ramp surface of adjustable access ramp 14 can comprise a ferrous material to cooperate with the magnetic wheels 4, 4a to keep the inspection crawler adhered to their surfaces. In the upper section of inspection crawler of UT and VT 1 is emission and reception device 31, that produce emission and reception signals carried by a wiring 8 to a computer on the outside of the coke drum 15 where they are analyzed and stored. On the back of UT and VT inspection crawler 1 at a certain height is a lighting system comprised of two lamps 5 located on each side of a video camera 6 with a visual field 7 that will enable a user to maneuver of the inspection crawler on the internal surface 16 of the coke drum 15 and for visual inspection of the areas to be analyzed inside the coke drum 51.

A method for cleaning and inspecting coke drum 15 is characterized by the introduction of cleaning and inspection system 23 into the coke drum, in order to perform the visual inspection and cleaning of the areas that require it to adapt them to the surface finish required for the inspection. UT with UT and VT inspection crawler 1, taking into account the procedures mentioned below:

Shown in FIGS. 1A, 1B are the details of the introduction of cleaning and inspection system 23 into the interior 51 of the coke drum 15, in which it is observed an entry of the cleaning and inspection system 23 in the vertical downward direction using access through the upper nozzle 17 or through the Stem Guide Enclosure Cover Sheet 95 (FIG. 6B) of the coke drum 15.

Shown in FIG. 2 is the 90° articulation (by gravity in some embodiments) of the support structure of the cleaning and inspection system 23 inside 51 of the coke drum 15.

Shown in FIGS. 3, 4 is the deployment of the cleaning manifold 26 by means of a retractable mechanism towards the internal wall 16 of the coke drum 15 and it is controlled by the approach sensor 60 in order to guarantee that there is the optimum distance to perform an adequate surface cleaning.

Once the remote visual inspection and the cleaning of the identified zones to be inspected with UT have been carried out, the inspection and cleaning system 23 of the coke drum 15 is removed by reversing the steps immediately disclosed herein above.

FIGS. 6A, 6B, 6C and 6D show adjustable access ramp 14 as being configured to couple to, and positioned in, an inlet to coke drum 15, such as the upper nozzle 17 (see FIG. 6A), in the Stem Guide Enclosure Cover Sheet 95 (FIG. 6B), in the lower section of the valve slide 200 (see FIG. 6C) or in the bottom flange 28 (see FIG. 6D) of the coke drum. Adjustable access ramp 14 includes a horizontal section having a horizontal length and a vertical section having an adjustable vertical length. Adjustable access ramp 14 has the purpose of allowing the entry and extraction of the UT and VT inspection crawler 1 into and out of an interior space 51 of coke drum 15 and travers along and inside surface of the interior space. Referring next to FIGS. 7A-7D, adjustable access ramp 14 is characterized by having a set of mechanism gears between which include drive gear 11 and two guided gears 10 in a meshing arrangement that respectively drive the rotation of two horizontal worm screws 12 which respectively drive vertical drive shafts 13. Vertical drive shafts 13 have a thread on their surface that generate an upward and downward movement of the vertical section of the ramp adjusted by rotation of the drive gear in order to have an adjustable vertical length to adjust the height of the upper nozzle 17, or considering the corresponding heights of the sliding valves either in their upper section 100 or lower 200 (FIG. 1B). Adjustable access ramp 14, in addition to being adjusted horizontally and vertically, is also angularly adjustable, by means of angular displacement device 90 mounted to a bottom end of the vertical section and comprised of a semi-circumferential surface that allows an angular displacement relative to the lower section of the adjustable access ramp to a predetermined angle. Adjustable access ramp 14 includes lighting system 80 located on its lower sides and front section having an adjustable front section length that serves as a guide for the extraction of UT and VT inspection crawler 1.

Figure 8:
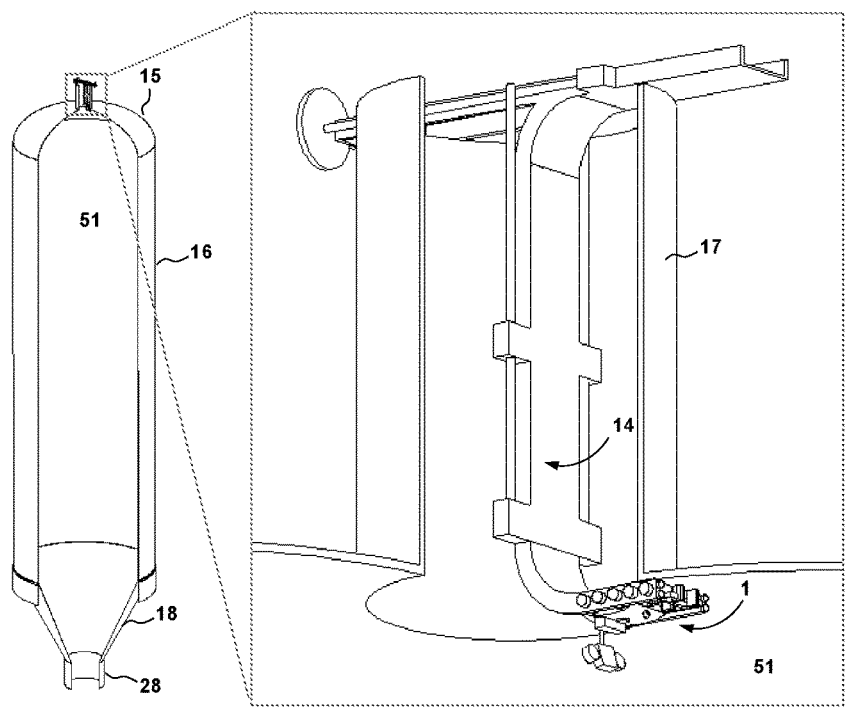
FIG. 8 is a detailed view of the displacement of the inspection crawler of UT and VT through the adjustable ramp into the delayed coke drum in accordance with the present disclosure.
Figure 9:
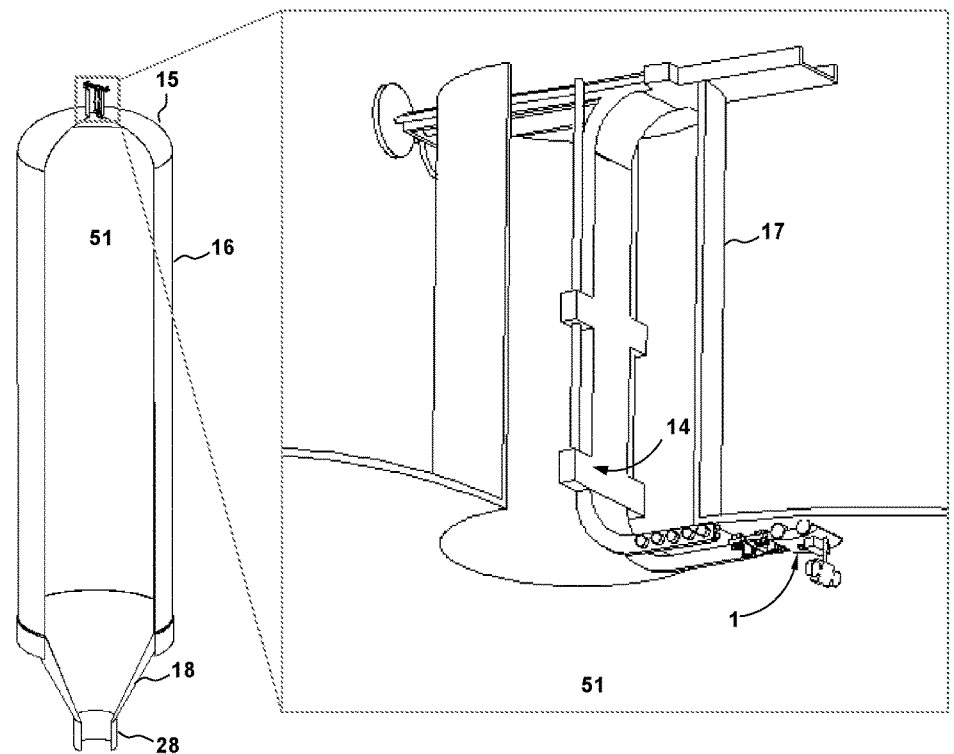
FIG. 9 is a detailed view of the displacement of the UT and VT Crawler towards the exterior of the delayed coke drum by use of the ramp in accordance with the present disclosure.

It should be appreciated by those skilled in the art that FIGS. 6A, 6B, 6C and 6D disclose the procedure of introducing UT and VT inspection crawler 1 to the inside 51 of the coke drum 15 with the use of the adjustable access ramp 14. In addition, FIGS. 8 and 9 show the positioning and removal of UT and VT inspection crawler 1 from the interior 51 of the coke drum 15 with the use of the adjustable ramp 14. In this particular embodiment the procedure is shown in a coke drum 15 without sliding valves 100 and 200. It should be noted that the UT and VT inspection crawler 1 introduction into and removal maneuver from the inside 51 is similarly performed in coke drums 15 with sliding valves 100 and 200 (FIG. 1B). Once the inspection and removal of the crawler from inside 51 of the coke drum 15 is completed, a user can remove the access ramp 14 from the upper nozzle 17 or from the respective sliding valves 100 and 200.

Embodiments of the present disclosure allow a totally independent operation of UT and VT inspection crawler 1 with respect to the cleaning and inspection structure 23, this characteristic is here to fore unknown in the automated systems of inspection of coke drums. Another advantage of embodiments of the present disclosure over the prior art is that UT and VT inspection crawler 1 can detect and characterize internal and external cracks regardless of the thickness of the wall in the cylindrical sections 16, conical section 18 and cone-skirt joint section. In this last section for the detection and characterization of the cracks AID 300 FIG. 10A and AOD 310 FIG. 10B of the delayed coke drums.

Figure 11:
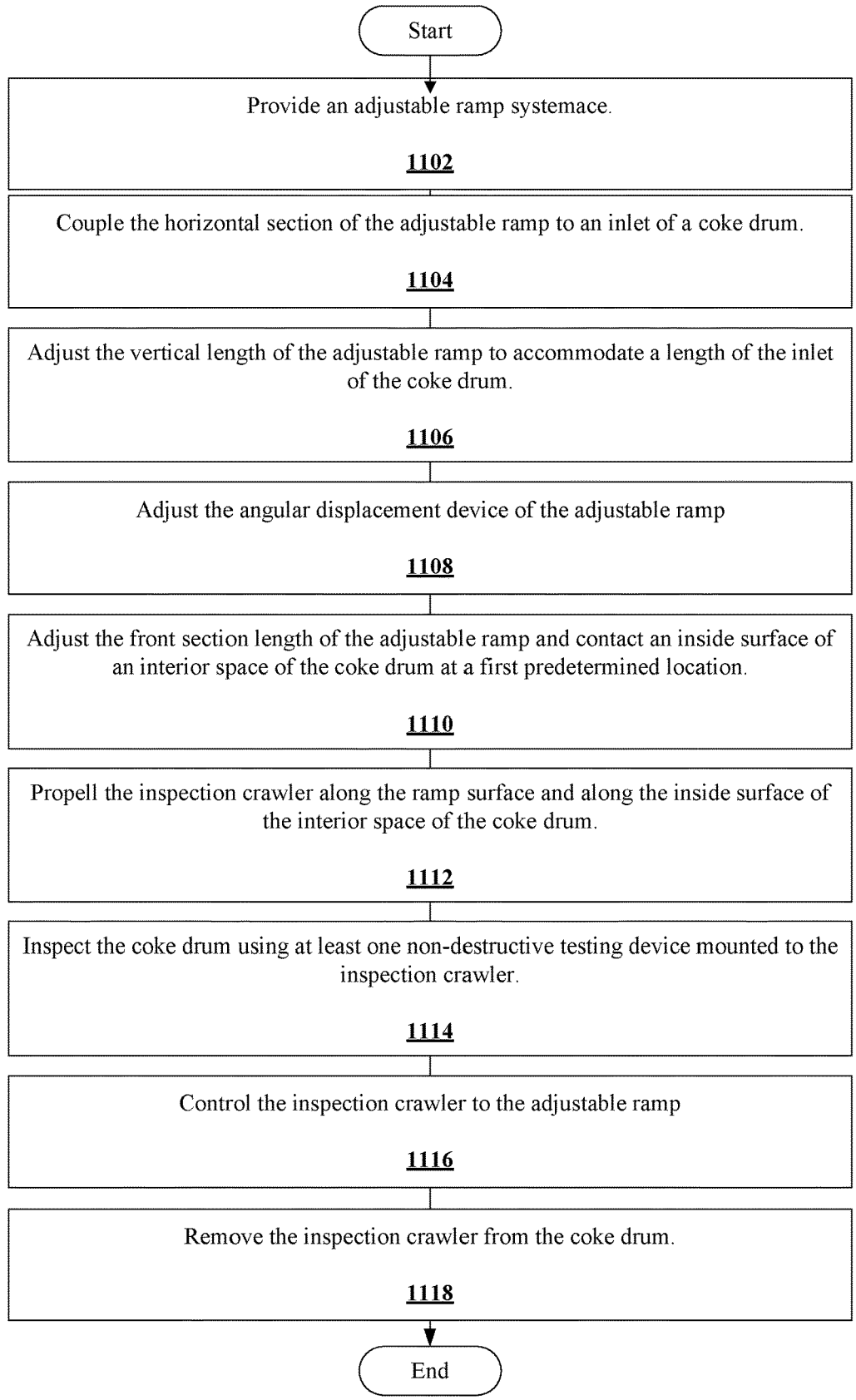
FIG. 11 is a flow chart of a method of inspecting a coke drum in accordance with the present disclosure.

Now with reference to FIG. 11, there is shown a flow chart of a method of inspecting a coke drum in accordance with the present disclosure.

While the foregoing is directed to embodiments of the present disclosure, other and further embodiments of the disclosure may be devised without departing from the basic scope thereof, and the scope thereof is determined by the claims that follow.

What is claimed is:

1. A coke drum inspection system comprising:
   an adjustable ramp system configured to transfer an inspection crawler into and out of an interior space of a coke drum, the adjustable ramp system comprising:
   a horizontal section having a horizontal length comprising a drive gear rotatably positioned on a first end, a first guided gear in meshing arrangement with the drive gear coupled to a first worm screw rotatably mounted to the horizontal section, a second guided gear in meshing arrangement with the drive gear coupled to a second worm screw rotatably mounted to the horizontal section;
   a vertical section having an adjustable vertical length, a first vertical drive shaft threadably engaged within a portion of the horizontal section and in meshing arrangement with the first worm screw, a second vertical drive shaft threadably engaged within a portion of the horizontal section and in meshing arrangement with the second worm screw;
   an angular displacement device positioned on a bottom end of the vertical section configured to be angularly adjustable relative to the vertical section;
   and a front section having an adjustable front section length coupled to the angular displacement device; and
   a ramp surface having an adjustable ramp length positioned on a portion of the horizontal section, the vertical section and the front section configured to provide a contiguous surface.

2. The coke drum inspection system of claim 1 wherein the horizontal section is configured to couple to an inlet of the coke drum.

3. The coke drum inspection system of claim 2 wherein the adjustable vertical length is configured to be adjusted by rotation of the drive gear to accommodate a length of the inlet of the coke drum.

4. The coke drum inspection system of claim 3 wherein the inlet of the coke drum comprises any of a flange and a sliding valve.

5. The coke drum inspection system of claim 4 wherein the angular displacement device is configured to angularly adjust the front section to a predetermined angle relative the vertical section and the front section is configured to adjust the adjustable front section length to contact an inside surface of the interior space of the coke drum at a predetermined location.

6. The coke drum inspection system of claim 5 wherein the inspection crawler comprises:
   a chassis and a drive system mounted to the chassis;
   a reception device configured to allow a remote control operation of the inspection crawler; and
   at least one non-destructive testing device mounted to the inspection crawler.

7. The coke drum inspection system of claim 6 wherein at least a portion of the drive system is comprised of a magnetic material, the ramp surface is comprised of a ferrous material and the coke drum is comprised of a ferrous material and wherein the drive system is configured to propel the inspection crawler along the ramp surface and along the inside surface of the interior space of the coke drum.

8. The coke drum inspection system of claim 6 wherein the at least one non-destructive testing device comprises an ultrasonic testing system.

9. The coke drum inspection system of claim 8 wherein the ultrasonic testing system comprises:
an articulating frame mounted to the chassis; and
a plurality of ultrasonic testing probes mounted to the articulating frame and configured to contact a portion of the inside surface of the interior space of the coke drum.

10. The coke drum inspection system of claim 6 wherein the at least one non-destructive testing device comprises a visual testing system.

11. The coke drum inspection system of claim 10 wherein the visual testing system comprises a camera and a lighting system.

12. The coke drum inspection system of claim 1 further comprising a lighting system positioned on the front section.

13. A method of inspecting a coke drum comprising:
providing an adjustable ramp system to transfer an inspection crawler into and out of an interior space of the coke drum comprising:
a horizontal section having a horizontal length comprising a drive gear rotatably positioned on a first end, a first guided near in meshing arrangement with the drive gear coupled to a first worm screw rotatably mounted to the horizontal section, a second guided near in meshing arrangement with the drive gear coupled to a second worm screw rotatably mounted to the horizontal section;
a vertical section having an adjustable vertical length, a first vertical drive shaft threadably engaged within a portion of the horizontal section and in meshing arrangement with the first worm screw, a second vertical drive shaft threadably engaged within a portion of the horizontal section and in meshing arrangement with the second worm screw;
an angular displacement device positioned on a bottom end of the vertical section configured to be angularly adjustable relative to the vertical section:
and a front section having an adjustable front section length coupled to the angular displacement device; and
a ramp surface having an adjustable ramp length positioned on a portion of the horizontal section, the vertical section and the front section configured to provide a contiguous surface.

14. The method of inspecting a coke drum of claim 13 further comprising coupling the horizontal section to an inlet of the coke drum.

15. The method of inspecting a coke drum of claim 14 further comprising adjusting the adjustable vertical length to accommodate a length of the inlet of the coke drum.

16. The method of inspecting a coke drum of claim 15 further comprising:
adjusting the angular displacement device; and
adjusting the adjustable front section length and contacting an inside surface of an interior space of the coke drum at a first predetermined location.

17. The method of inspecting a coke drum of claim 16 further comprising:
providing the inspection crawler having a chassis and a drive system mounted to the chassis and at least one non-destructive testing device mounted to the inspection crawler;
placing the inspection crawler on the adjustable ramp system; and
remotely controlling the inspection crawler from outside of the interior space of the coke drum.

18. The method of inspecting a coke drum of claim 17 further comprising propelling the inspection crawler along the ramp surface and along the inside surface of the interior space of the coke drum.

19. The method of inspecting a coke drum of claim 18 further comprising inspecting the coke drum using the at least one non-destructive testing device.

20. The method of inspecting a coke drum of claim 19 further comprising:
controlling the inspection crawler to the adjustable ramp system; and
removing the inspection crawler from the coke drum.

21. The method of inspecting a coke drum of claim 20 further comprising:
adjusting the angular displacement device;
adjusting the adjustable front section length and contacting an inside surface of the interior space of the coke drum at a second predetermined location;
placing the inspection crawler on the adjustable ramp system;
remotely controlling the inspection crawler from outside of the interior space of the coke drum;
propelling the inspection crawler along the ramp surface and along the inside surface of the interior space of the coke drum; and
inspecting the coke drum using the at least one non-destructive testing device.

22. The method of inspecting a coke drum of claim 18 wherein the at least one non-destructive testing device comprises an ultrasonic testing system, the method further comprising ultrasonically inspecting the coke drum.

23. The method of inspecting a coke drum of claim 22 wherein the ultrasonic testing system further comprises a plurality of ultrasonic testing probes; and
positioning the plurality of ultrasonic testing probes to contact the inside surface of the interior space of the coke drum.

24. The method of inspecting a coke drum of claim 18 wherein the at least one non-destructive testing device comprises a visual testing system, the method further comprising visually inspecting the interior space of the coke drum.

25. The method of inspecting a coke drum of claim 13 further comprising providing a lighting system positioned on the front section and lighting the interior space of the coke drum.

* * * * *